United States Patent [19]

Young

[11] 4,291,484
[45] Sep. 29, 1981

[54] ILLUMINATED FISHING FLOAT

[76] Inventor: Earlwood Young, 8617 Trevarthon Rd., Orlando, Fla. 32807

[21] Appl. No.: 940,149

[22] Filed: Sep. 6, 1978

[51] Int. Cl.³ .............................................. A01K 93/00
[52] U.S. Cl. ..................................... 43/17.5; 9/8.3 E
[58] Field of Search ................... 43/17.5, 17; 9/8.3 R, 9/8.3 E

[56] References Cited

U.S. PATENT DOCUMENTS

| | | |
|---|---|---|
| 240,611 | 4/1881 | Redfield . |
| 546,771 | 9/1895 | Benoit . |
| 728,674 | 5/1903 | Cook . |
| 2,088,201 | 7/1937 | Goertzen . |
| 2,193,404 | 3/1940 | Goertzen . |
| 2,201,588 | 5/1940 | Kuhns .................... 43/17 |
| 2,252,358 | 8/1941 | Tosi . |
| 2,280,457 | 4/1942 | Sutcliffe . |
| 2,485,087 | 10/1949 | Diamond . |
| 2,490,669 | 12/1949 | Burke . |
| 2,654,972 | 10/1953 | Hollingsworth . |
| 2,777,238 | 1/1957 | Taylor et al. ........................... 43/17 |
| 3,528,188 | 9/1970 | Manross ............................... 43/17.5 |

Primary Examiner—Roscoe V. Parker
Attorney, Agent, or Firm—Cushman, Darby & Cushman

[57] ABSTRACT

A fishing float which removably receives a penlight to provide illumination both to indicate the position of the float and to attract the fish. The float is generally top-shaped and at least partially formed of transparent materials. A reflector is included in the upper portion of the shell to reflect a portion of the light downward to illuminate the lower portion of the shell to attract fish.

7 Claims, 4 Drawing Figures

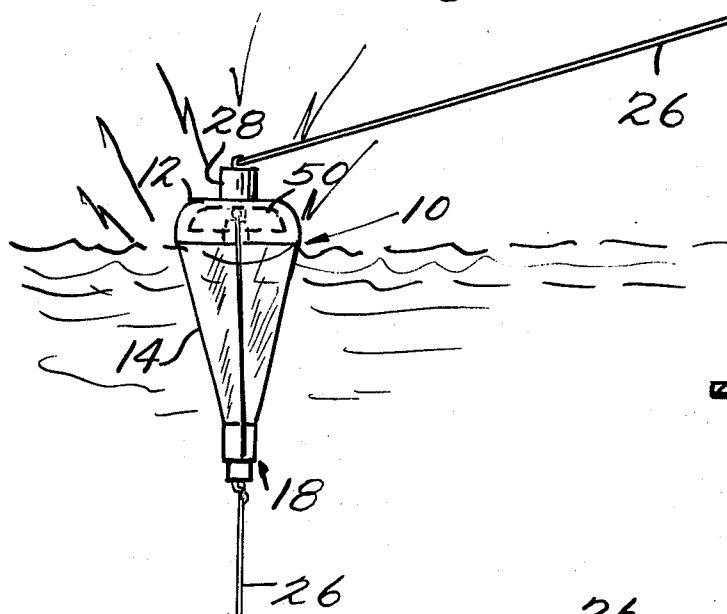
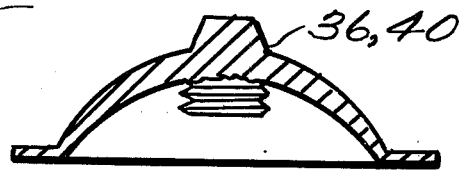
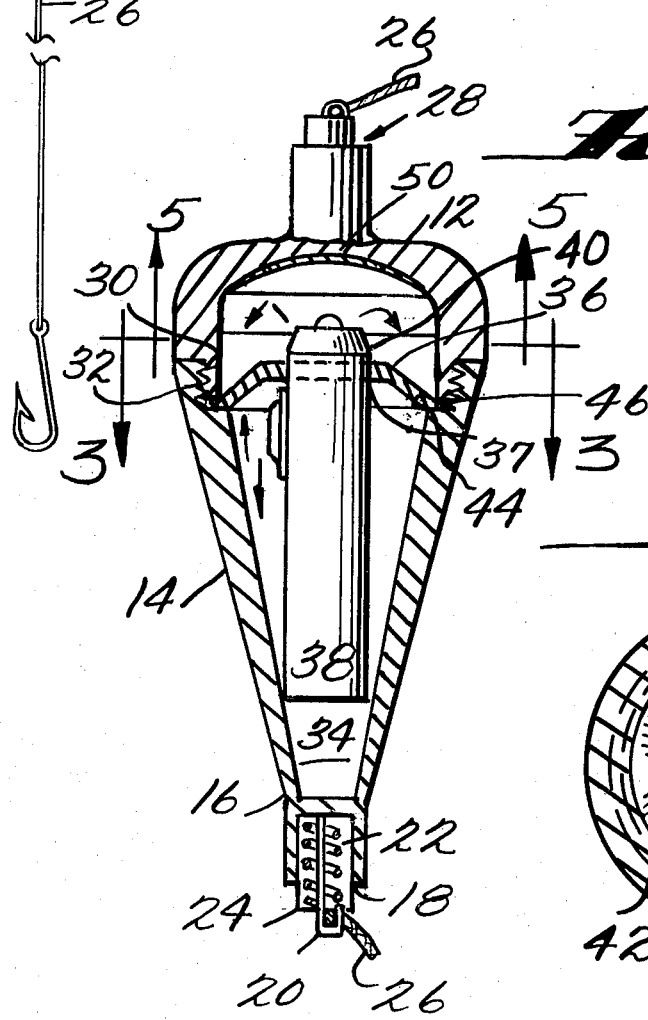
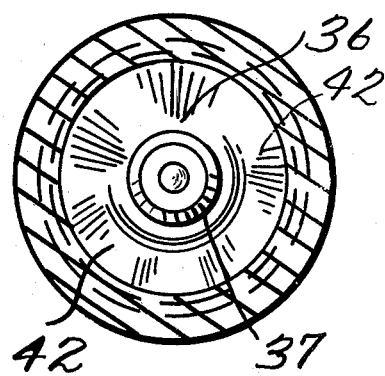

ILLUMINATED FISHING FLOAT

FIELD OF THE INVENTION

The present invention relates to fishing floats and more particularly, to illuminated fishing floats.

DESCRIPTION OF THE PRIOR ART

In general, illuminated fishing floats are well known. For example, fishing floats including a lighting mechanism activated in response to a strike on the line, are described in U.S. Pat. No. 2,088,201 (Geotzern, 1937), U.S. Pat. No. 2,193,404 (Goetzern, 1940), U.S. Pat. No. 2,201,588 (Kuhns, 1940), U.S. Pat. No. 2,252,358 (Tosi, 1941), U.S. Pat. No. 2,280,457 (Sutcliffe, 1942), U.S. Pat. No. 2,490,669 (Burke, 1946) and U.S. Pat. No. 2,654,972 (Hollingsworth, 1953). In the floats described in those patents, in each instance, the light mechanism provides an illumination visible above the water level. However, the switching mechanisms for such floats are necessarily waterproof. Accordingly, the floats are relatively complex and expensive.

Floats including lighting provisions to attract fish are also known. For example, U.S. Pat. No. 2,485,087 (Diamond, 1949) describes a fishing float for night time fishing wherein both ends of the bobber are illuminated by light pipes. Fish are attracted by shining a portion of the light downwardly into the water through one light pipe while another light pipe provides an illumination above water to indicate the position of the float to the fisherman. However, the light pipe structure is relatively complex and expensive.

Floats having a generally conical lower portion are also well known in the art. Reference in this regard is made to U.S. Pat. No. 240,611 (Redfield, 1881), U.S. Pat. No. 546,771 (Benoit, 1895) and U.S. Pat. No. 728,674 (Cook, 1903).

SUMMARY OF THE INVENTION

The present invention provides a relatively simple and inexpensive fishing float which is illuminated to provide an indication of position and fish strikes to the fisherman and for attracting fish. This is accomplished through utilization of a two-piece shell. The upper portion is at least partially transparent and the lower portion is at least partially transparent or translucent. The upper and lower portions of the shell fit together to provide a watertight seal. A support member, adapted to receive a conventional pen-light is engaged in the shell cavity. The support member disposes the pen-light facing upwardly towards the upper shell. A reflector disposed in the upper shell directs a portion of the light beam downward to illuminate the lower shell to attract fish. Light shining through the transparent portion of the upper dome is normally visible above the water and indicates position to the fisherman.

The shell is generally top-shaped to present relatively little water resistance when a fish strikes. Thus, when a fish strikes the float is submerged. The disappearance of the normally visible illumination indicates a strike.

BRIEF DESCRIPTION OF THE DRAWINGS

A detailed description of the preferred embodiment will hereinafter be described in conjunction with the following drawing wherein like numerals denote like elements and:

FIG. 1 shows a side view of a float in accordance with the present invention;

FIG. 2 shows a sectional side view of the float;

FIG. 3 shows a downward looking sectional view of the float; and

FIG. 4 shows a sectional side view of an alternative embodiment of a support member.

Referring now to FIGS. 1 and 2 of the drawing, there is shown a float 10 in accordance with the present invention. Float 10 suitably comprises an upper shell member 12 and lower shell member 14.

Lower shell member 14 is generally frustroconical, having a vertex 16 at one end. Lower shell 14 is formed of a transparent or translucent plastic. A spring loaded eyelet mechanism 18 is included at the vertex end of lower shell 14. A metal wire 20 is suitably molded into or otherwise affixed to the vertex of lower shell 14. A spring 22 is disposed about wire 20 then capped with a plastic cylinder 24. Cylinder 24 includes a central aperture for passing wire 20. Wire 20 is then bent to secure shell 24 to spring 22 and to provide a catch mechanism for a fishing line 26.

Upper shell 12 is suitably formed of a transparent material such as transparent plastic and is generally dome-shaped. A spring loaded eyelet mechanism 28 for receiving a fishing line similar to mechanism 18 is provided at the apex of upper shell 12. The base of upper shell 12 is adapted to mate with the end of lower shell 14 opposite vertex 16, to effect a watertight seal. The mating of upper shell 12 and lower shell 14 forms a watertight cavity 34 in the interior of the shell. The watertight engagement is preferably achieved through use of corresponding threads 30 and 32 on upper shell 12 and lower shell 14, respectively. As will hereinafter be explained, it is preferable that threads 30 of upper shell 12 are exterior threads and threads 32 of lower shell 14 are interior threads.

A support member 36, adapted to receive a conventional pen-light, is disposed within cavity 34. Support member 36 is preferably generally disc-shaped or hemisphere-shaped with a central cavity for receiving pen-light 38. Support member 36 is at least partially transparent to permit passage of light, as will be explained, to illuminate lower shell 14. To this end, support member 36 is preferably formed of transparent plastic. Support member 36 may also include apertures 42, as shown in FIG. 3.

Support member 36 receives pen-light 38 through a central aperture 37. As is well known, pen-light 38 conventionally includes a cap 40. Cap 40 is threaded into internal threads (not shown) on the pen-light body. Central aperture 37 may be of such dimensions to pass the threaded body of pen-light 38 but smaller than cap 40. Thus, when cap 40 is threaded into the body of the pen-light, support member 36 is fixed on pen-light 38 between the cap and body. Alternatively, support member 36 and pen-light cap 40 may be formed as an integral member such as shown in section in FIG. 4. The integral member would replace the cap on the conventional pen-light.

Support member 36 is received in cavity 34 to dispose pen-light 38 to project a light beam in an upward direction. A ledge 44 is included on the interior of lower shell 14. Ledge 44 is suitably disposed proximate to interior threads 32. Support member 36 suitably includes a peripheral lip 46. Peripheral lip 46 is planar in dimensions corresponding to ledge 44 and is disposed on ledge 44. When upper shell 12 is threadedly received by lower shell 14, the interior portion of upper shell 12 engages peripheral lip 46 of support member 36 and maintains support member 36 in position. If desired, peripheral lip 46 may be formed of or coated with a resilient material to help insure a watertight seal between upper and lower shells 12 and 14. Other mechanisms for fixing support member 36 within cavity 34 can, of course, be used.

Support member 36 maintains pen-light 38 in the cavity 34 with the light bulb upward and battery downward. This disposition is particularly advantageous. A proper balance and distribution of the weight of pen-light 38 is thus provided, in conjunction with the "top" shape of float 10. Further, when in use, the weight of pen-light 38 as disposed within cavity 34 by support member 36 maintains float 10 in a partly submerged state. As shown in FIG. 1, the upper shell 12, and if desired, a portion of lower shell 14 remain above water while the larger portion of lower shell 14 is submerged. In addition, the frustro-conical shape of lower shell 14 provides relatively little resistance when a fish strikes the line facilitating a catch.

Support member 36 maintains pen-light 38 in cavity 34 such that a beam of light is projected upward towards upper shell 12. A portion of the light beam is passed through the transparent portions of float 10 disposed above the water line, to provide illumination visible from above the water, indicating the position of the float to the fisherman. However, the frustro-conical shape of lower shell 14 and balanced weight distribution of pen-light 38 present relatively little resistance to submersion in the water. Accordingly, float 10 tends to totally submerge in response to a strike. Thus, disappearance of the illumination normally visible above the water signifies a strike. The transparent portions of upper shell 12 may be advantageously positioned to add to this effect.

In addition, a portion of the light beam is reflected downwardly to illuminate lower shell 14 to attract fish. A reflector 50 is disposed within upper shell 12. Reflector 50 may be a metallic paint or foil deposited on the inner surface of upper shell 12. The reflector is suitably disposed on the interior apex of upper shell 12. Reflector 50 suitably covers only a portion of the interior of shell 12 to allow for passage of the light through various transparent portions of upper shell 12 for position/strike indication. A portion of the light beam from pen-light 38 is reflected downwardly through the transparent portions of support member 36 to illuminate lower shell 14. Lower shell 14 is at least in part transparent or translucent or a combination of both. The illumination of the submerged portion of lower shell 14 operates as a lure to fish. Various patterns of transparent or translucent or opaque portions of lower shell 14 may be utilized to provide various lure effects.

It will be understood that the above description is of illustrative embodiments of the present invention and that the invention is not limited to the specific form shown. For example, upper shell 12 may, in some circumstances, advantageously be in forms other than dome-shaped. For example, in some instances, it may be desirable to utilize a second frustro-conical shell for upper shell 12. However, the desirable balance and submergence characteristics provided by the combination of the top-shaped shell (dome-shaped top and conical bottom) in combination with the weight of the flashlight may be deleteriously effected. In any event, these and other modifications can be made in the design and arrangement of the elements as will be apparent to those skilled in the art without departing from the scope of the invention as expressed in the appended claims.

What is claimed is:

1. In a fishing float of the type comprising:
    a body adapted for partial submersion in water, said body including a frustro-conical lower shell having a vertex at one end, an upper shell, and means for effecting a removable watertight mating between said upper shell and the end of said lower shell opposite said vertex, said mating forming a watertight cavity in the interior of said body, each of said upper and lower shells including light-passing portions;
    said float further comprising support means, adapted for receiving a pen-light, for removably fixing said pen-light in said cavity whereby a beam of light produced by said pen-light is directed towards said upper shell to illuminate said upper shell light-passing portion and a reflector disposed in said upper shell to direct light through said lower shell light-passing portion, the improvement wherein:
    said support means comprises a support member having a central aperture for receiving said pen-light, a peripheral portion at least partially formed of a resilient material for engaging said body and at least one transparent portion disposed to pass reflected light to said lower shell light-passing portion; and
    said means for effecting a removable watertight mating comprises respective corresponding threaded portions on said upper and lower shells, said threaded portions cooperating to engage said support member resilient peripheral portion between said upper and lower shells to effect a watertight seal between said upper and lower shells.

2. The float of claim 1, wherein said reflector comprises reflective material deposited on the interior surface of said upper shell.

3. The float of claims 1 or 2 wherein said support member comprises a transparent disc having a central aperture for receiving said pen-light.

4. The float of claim 1 or 2 wherein:
    said lower shell threads are interior threads disposed in said cavity at the end of said lower shell opposite said vertex;
    said upper shell threads are exterior threads such that a portion of said upper shell extends into said cavity; and
    a ledge is disposed on said lower shell portion interior proximate to said lower shell portion threads, whereby said upper shell portion extending into the cavity engages said support member to maintain said support member peripheral portion on said ledge.

5. The float of claims 1 or 2 wherein said upper shell is generally dome-shaped.

6. The float of claims 1 or 2 wherein both said upper and lower shells are at least partly transparent.

7. The float of claims 1 or 2 wherein said upper shell is at least partly transparent and said lower shell is translucent.

* * * * *